(No Model.)
E. B. CUTTEN.
ELECTRODE FOR VOLTAIC CELLS.
No. 510,902. Patented Dec. 19, 1893.
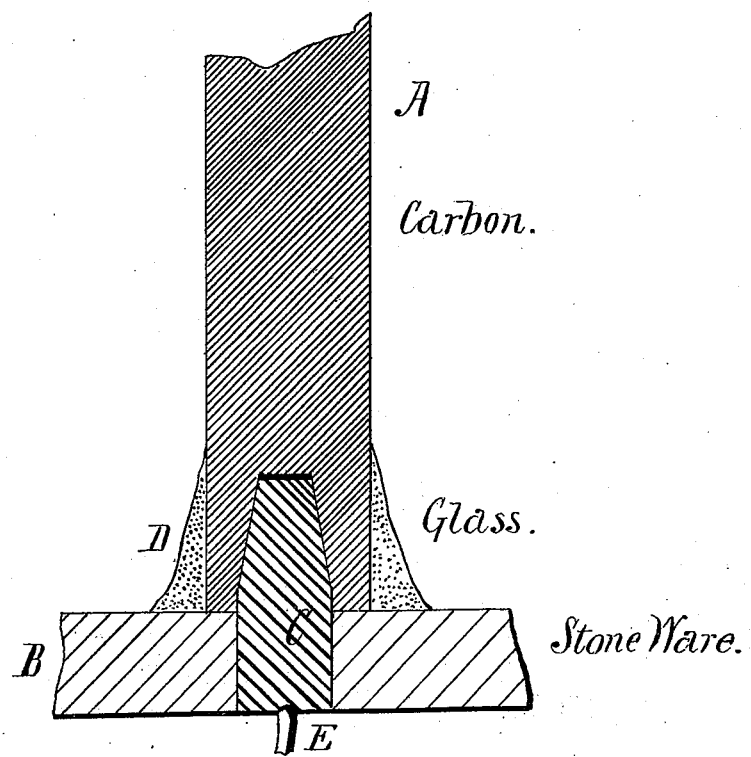
WITNESSES:
INVENTOR
Elisha B. Cutten
BY Park Benjamin
his ATTORNEY.

UNITED STATES PATENT OFFICE.

ELISHA BARTON CUTTEN, OF NEW YORK, N. Y.

ELECTRODE FOR VOLTAIC CELLS.

SPECIFICATION forming part of Letters Patent No. 510,902, dated December 19, 1893.

Application filed May 1, 1893. Serial No. 472,488. (No model.)

*To all whom it may concern:*

Be it known that I, ELISHA BARTON CUTTEN, of the city, county, and State of New York, have invented a new and useful Improvement in Electrodes for Voltaic Cells, of which the following is a specification.

In another application for Letters Patent, Serial No. 467,926, filed by me March 28, 1893, I have fully described and claimed the construction of a carbon electrode, consisting substantially of a mass of carbon, a support therefor, and a wedge-shaped or conical pin, also of carbon. This pin is received in the support and is also driven into a suitable opening in the end of the carbon electrode, so that it serves as a means of attaching the carbon electrode and its support together. Both the carbon pin and the main body of carbon in which it is received are described in my aforesaid application as impregnated with paraffine.

The object of my present invention is to provide an efficient means of connecting the carbon electrode to its support, and also of protecting the joint between electrode and support; and my said invention consists in securing said carbon to said support by means of glass, which material also is used to surround, and hence to protect, the joint from the effects of the liquids or other materials in the cell.

In the accompanying drawing is represented a sectional view of the carbon and its support, with the glass applied at the joint as hereinafter described.

A represents the main body of carbon which constitutes the electrode. It is made preferably in the form of a bar of any suitable size. Inasmuch as my invention is more particularly applicable to electrolytic cells in which aqueous solutions in large quantities are electrolyzed, the carbon A in such a cell would be from two to three feet in length by some four inches in thickness, and in a single cell many such carbon electrodes might be used.

B is a flat plate or support, here shown as made of chemical stoneware; but any other material which will resist the liquids or other substances used in the cell may be employed.

C is a tapered rod or pin which enters through an opening in the stoneware support B and is driven into a conical recess in the carbon A. This pin, with a carbon A two or three feet long, would be about nine inches in length by one inch in diameter.

As described in my aforesaid prior application, I may impregnate the pin C and the part of the carbon electrode A immediately surrounding the same with paraffine; but it is not absolutely necessary to do this when my present invention is employed. While the pin C will serve to secure the carbon A to the support B, I find also that by means of my invention a much firmer and stronger support can be obtained, and at the same time the joint between the carbon A and stoneware partition B can be completely protected from chemical attack. I therefore apply to the joint, either before or after the pin C is inserted, glass, D in a fused or molten state. This I may do by placing the pieces of glass at the joint and fusing them by means of a blow-pipe. The glass then runs in between the carbon A and the stoneware support B, and cements one firmly to the other. It also forms an envelope, as shown at D, directly around the joint, and thus serves the double purpose of securely binding the carbon to the stoneware support B, and also of providing an envelope, D, not attackable by any ordinary acids or other substances in the cell, by means of which the joint is completely protected.

The carbon A may, if desired, be fastened to the support B by means of the glass D before the pin C is inserted; and I have found it even possible to fasten the carbon and support together, and then drill the opening in the carbon to receive the pin C, which is afterward driven in. This shows with what firmness the glass holds the carbon to its support. The conductor carrying the current through the electrode A is connected to the pin C, as shown at E.

I claim—

1. The combination in a voltaic cell of an electrode of carbon, a support to which said electrode is attached and an envelope or coating of glass surrounding and closing the joint between electrode and support, substantially as described.

2. The combination in a voltaic cell of an electrode of carbon, and a support, the said electrode being united to said support by glass, substantially as described.

3. The combination in a voltaic cell of an electrode of carbon, and a support, the said electrode being united to said support by glass, and an envelope or coating of glass surrounding and closing the joint between electrode and support, substantially as described.

4. The combination in a voltaic cell of an electrode of carbon, a support of stoneware, and a body of glass cementing together the said electrode and said support, substantially as described.

5. The combination in a voltaic cell of the carbon electrode A, support B, pin C, and glass envelope or coating D, substantially as described.

ELISHA BARTON CUTTEN.

Witnesses:
H. R. MOLLER,
M. BOSCH.